(12) United States Patent
Tsuda

(10) Patent No.: US 9,179,361 B2
(45) Date of Patent: Nov. 3, 2015

(54) WIRELESS COMMUNICATION DEVICE, PROGRAM, WIRELESS COMMUNICATION METHOD, AND WIRELESS COMMUNICATION SYSTEM

(75) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 835 days.

(21) Appl. No.: 13/162,462

(22) Filed: Jun. 16, 2011

(65) Prior Publication Data

US 2011/0317583 A1  Dec. 29, 2011

(30) Foreign Application Priority Data

Jun. 23, 2010 (JP) .............................. P2010-142384

(51) Int. Cl.

| | |
|---|---|
| *H04W 36/36* | (2009.01) |
| *H04W 36/30* | (2009.01) |
| *H04W 28/06* | (2009.01) |
| *H04W 48/20* | (2009.01) |

(52) U.S. Cl.
CPC .............. *H04W 28/06* (2013.01); *H04W 36/30* (2013.01); *H04W 36/36* (2013.01); *H04W 48/20* (2013.01)

(58) Field of Classification Search
None
See application file for complete search history.

(56) References Cited

U.S. PATENT DOCUMENTS

| 6,668,159 | B1 * | 12/2003 | Olofsson et al. ............ 455/67.11 |
|---|---|---|---|
| 6,771,622 | B1 * | 8/2004 | Banerjee ........................ 370/331 |
| 7,502,347 | B2 * | 3/2009 | Backes et al. ................. 370/331 |
| 2002/0022487 | A1 * | 2/2002 | Ahn ............................... 455/453 |
| 2002/0097697 | A1 * | 7/2002 | Bae et al. ....................... 370/335 |
| 2002/0160813 | A1 * | 10/2002 | Miya ............................. 455/562 |
| 2004/0146027 | A1 * | 7/2004 | Shinozaki et al. ............ 370/335 |
| 2004/0214602 | A1 * | 10/2004 | Aoyama ........................ 455/561 |
| 2005/0070293 | A1 * | 3/2005 | Tsukiji et al. ............... 455/452.1 |
| 2007/0195715 | A1 * | 8/2007 | Yamano et al. ................ 370/254 |
| 2010/0311426 | A1 * | 12/2010 | Muller ........................... 455/446 |
| 2012/0120827 | A1 * | 5/2012 | Tsuda ............................ 370/252 |

FOREIGN PATENT DOCUMENTS

JP    2008-298484    12/2008

* cited by examiner

*Primary Examiner* — Ayaz Sheikh
*Assistant Examiner* — Tarell Hampton
(74) *Attorney, Agent, or Firm* — Sony Corporation

(57) ABSTRACT

There is provided a wireless communication device including a receiving unit that receives a radio signal transmitted from a base station providing a wireless communication service, a congestion calculation unit that calculates a degree of congestion of the wireless communication service based on a received result of the radio signal by the receiving unit, and an effective communication rate estimation unit that estimates an effective communication rate of the wireless communication service by use of the degree of congestion calculated by the congestion calculation unit.

18 Claims, 10 Drawing Sheets

| $SIR_{CPICH}$ [dB] | MAXIMUM COMMUNICATION RATE [bps] |
|---|---|
| SIR < 1.0 | 68.5k |
| 1.0 ≦ SIR < 2.0 | 86.5k |
| 2.0 ≦ SIR < 3.0 | 116.5k |
| ⋮ | ⋮ |
| 13.0 ≦ SIR < 14.0 | 1.292M |
| 14.0 ≦ SIR < 15.0 | 1.660M |
| 15.0 ≦ SIR < 16.0 | 1.783M |
| ⋮ | ⋮ |
| 27.0 ≦ SIR < 28.0 | 11.685M |
| 28.0 ≦ SIR < 29.0 | 12.111M |
| 29.0 ≦ SIR < 30.0 | 12.779M |

FIG. 4

| SIR$_{CPICH}$ [dB] | MAXIMUM COMMUNICATION RATE [bps] |
|---|---|
| SIR < 1.0 | 68.5k |
| 1.0 ≦ SIR < 2.0 | 86.5k |
| 2.0 ≦ SIR < 3.0 | 116.5k |
| ⋮ | ⋮ |
| 13.0 ≦ SIR < 14.0 | 1.292M |
| 14.0 ≦ SIR < 15.0 | 1.660M |
| 15.0 ≦ SIR < 16.0 | 1.783M |
| ⋮ | ⋮ |
| 27.0 ≦ SIR < 28.0 | 11.685M |
| 28.0 ≦ SIR < 29.0 | 12.111M |
| 29.0 ≦ SIR < 30.0 | 12.779M |

FIG. 8

| $SIR_{CPICH}$ [dB] | MAXIMUM COMMUNICATION RATE [bps] |
|---|---|
| SIR < 1.0 - c | 68.5k |
| 1.0 - c ≦ SIR < 2.0 - c | 86.5k |
| 2.0 - c ≦ SIR < 3.0 - c | 116.5k |
| ⋮ | ⋮ |
| 13.0 - c ≦ SIR < 14.0 - c | 1.292M |
| 14.0 - c ≦ SIR < 15.0 - c | 1.660M |
| 15.0 - c ≦ SIR < 16.0 - c | 1.783M |
| ⋮ | ⋮ |
| 27.0 - c ≦ SIR < 28.0 - c | 11.685M |
| 28.0 - c ≦ SIR < 29.0 - c | 12.111M |
| 29.0 - c ≦ SIR < 30.0 - c | 12.779M |

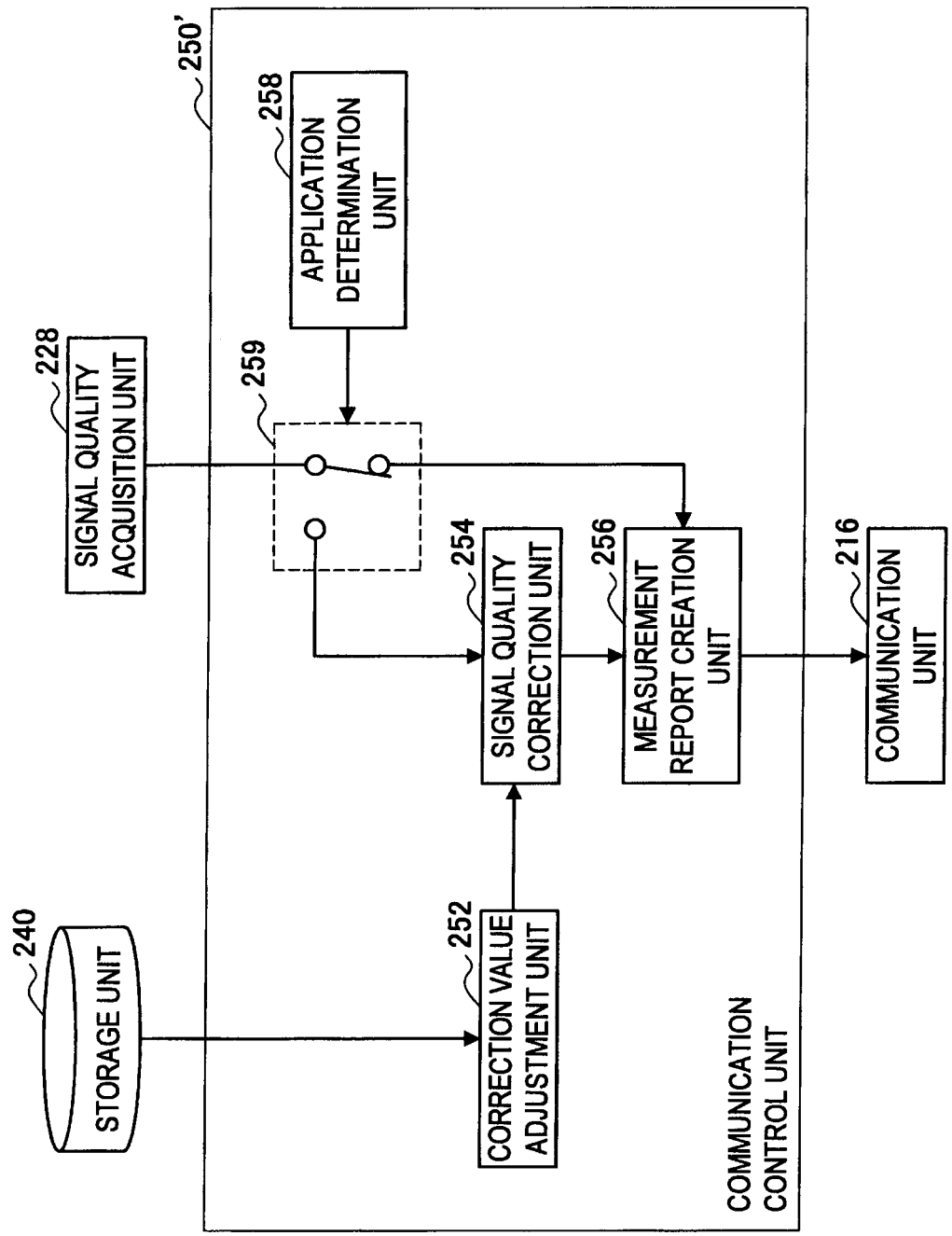

WIRELESS COMMUNICATION DEVICE, PROGRAM, WIRELESS COMMUNICATION METHOD, AND WIRELESS COMMUNICATION SYSTEM

BACKGROUND

The present disclosure relates to a wireless communication device, a program, a wireless communication method, and a wireless communication system.

The 3G (third-generation) mobile phone service started in 2002 in Japan. Although exchange of small size packets such as voice or email was a main application initially, download of larger size packets such as download of music files or viewing of shared videos has become increasingly popular since introduction of HSDPA (High Speed Downlink Packet Access) or the like.

Further, with an increase in downloaded packet size, expansion on the side of a wireless network has been also made, and the HSPA+ service that achieves speeds up to 21 Mbps in 3GPP, and the Mobile WiMAX service that achieves speeds up to 40 Mbps in IEEE started. Further, in 3GPP, LTE (Long Term Evolution) that uses OFDMA (Orthogonal Frequency Division Multiple Access) for downlink, just like Mobile WiMAX (Worldwide Interoperability for Microwave Access), is scheduled to start in the latter half of 2010, and 4G (LTE-Advanced) is scheduled to start around 2015. By the start of such services, it is expected to achieve speeds up to 1 Gbps in a semi-fixed state and speeds up to 100 Mbps in a mobile environment.

Because various wireless communication services that offer a high communication rate are scheduled to start as described above, a scheme for effective use of a wireless resource in a heterogeneous wireless environment would become increasingly important in the coming years. For example, a wireless communication device that is compatible with a plurality of wireless communication services can select a wireless communication service to use based on the maximum communication rate of each wireless communication service or a received signal strength. However, when traffic is concentrated on a wireless communication service with a high maximum communication rate, a case is assumed where the effective communication rate (actual communication rate) of the wireless communication service decreases, and as a result, the effective communication rate of another wireless communication service becomes higher. Note that Japanese Unexamined Patent Publication No. 2008-298484 contains description about a wireless communication device such as a mobile phone.

SUMMARY

A core network including a base station can easily grasp information related to the effective communication rate of a wireless communication service as described above. However, because it is difficult for a wireless communication device that does not establish a connection with a base station, for example, to obtain the effective communication rate by actual measurement, it is difficult also to obtain information related to the effective communication rate of each wireless communication service.

In light of the foregoing, it is desirable to provide novel and improved wireless communication device, program, wireless communication method, and wireless communication system that can estimate the effective communication rate of a wireless communication service in the wireless communication device.

According to an embodiment of the present disclosure, there is provided a wireless communication device including a receiving unit that receives a radio signal transmitted from a base station providing a wireless communication service, a congestion calculation unit that calculates a degree of congestion of the wireless communication service based on a received result of the radio signal by the receiving unit, and an effective communication rate estimation unit that estimates an effective communication rate of the wireless communication service by use of the degree of congestion calculated by the congestion calculation unit.

The wireless communication device may further include a maximum communication rate estimation unit that estimates a maximum communication rate of the wireless communication service based on a signal quality of the radio signal received by the receiving unit. The effective communication rate estimation unit may estimate the effective communication rate based on the maximum communication rate estimated by the maximum communication rate estimation unit and the degree of congestion calculated by the congestion calculation unit.

The maximum communication rate estimation unit may estimate the maximum communication rate according to a criterion where the maximum communication rate becomes higher as the signal quality of the radio signal received by the receiving unit is higher.

The maximum communication rate estimation unit may estimate the maximum communication rate corresponding to the signal quality of the radio signal received by the receiving unit by referring to a table indicating a relationship between the signal quality and the maximum communication rate.

The effective communication rate estimation unit may estimate the effective communication rate according to a criterion where the effective communication rate with respect to the maximum communication rate becomes lower as the degree of congestion calculated by the congestion calculation unit is higher.

The wireless communication device may further include a correlation detection unit that detects a correlation between the radio signal received by the receiving unit and each of a plurality of scrambling codes when the base station transmits the radio signal spectrum-spread by a scrambling code. The congestion calculation unit may calculate the degree of congestion from a relationship between a maximum correlation detected by the correlation detection unit and another correlation.

The congestion calculation unit may calculate a ratio of a maximum correlation detected by the correlation detection unit and a minimum correlation as the degree of congestion.

The correlation detection unit may detect a correlation between the radio signal received by the receiving unit and each of the plurality of scrambling codes included in a scrambling code group specified by a second step in three-step cell search.

When the base station transmits a radio signal by OFDMA, the congestion calculation unit may calculate a proportion of a number of allocated subcarriers to a total number of subcarriers as the degree of congestion based on information obtained from wireless communication received by the receiving unit.

The wireless communication device may father include a measurement unit that measures an actual effective communication rate after establishing a connection with the base station, a maximum communication rate inverse operation unit that inversely calculates a maximum communication rate from which the effective communication rate measured by the measurement unit is estimated according to a criterion of the effective communication rate estimation unit by use of the degree of congestion calculated by the congestion calculation unit, and an update unit that updates the table based on a relationship between the maximum communication rate obtained by inverse operation by the maximum communication rate inverse operation unit and the signal quality of the radio signal received by the receiving unit.

The wireless communication device may father include a storage unit that stores the effective communication rate estimated by the effective communication rate estimation unit for each wireless communication service, and a connection destination selection unit that selects a connection destination wireless communication service by referring to the effective communication rate for each wireless communication service stored in the storage unit.

The wireless communication device may father include a correction unit that corrects a received quality of the radio signal in accordance with the effective communication rate estimated by the effective communication rate estimation unit, a creation unit that creates a measurement report based on a corrected received quality of the radio signal corrected by the correction unit, and a transmitting unit that transmits the measurement report created by the creation unit to the base station.

When the effective communication rate estimated by the effective communication rate estimation unit is low, the correction unit may correct the received quality of the radio signal to be relatively lower.

The wireless communication device may father include an application determination unit that determines sensitivity of an application used by the wireless communication device with respect to a communication rate. When it is determined that the application is not sensitive to a communication rate, the creation unit may create the measurement report based on an uncorrected received quality of the radio signal.

According to another embodiment of the present disclosure, there is provided a program causing a computer to function as a receiving unit that receives a radio signal transmitted from a base station providing a wireless communication service, a congestion calculation unit that calculates a degree of congestion of the wireless communication service based on a received result of the radio signal by the receiving unit, and an effective communication rate estimation unit that estimates an effective communication rate of the wireless communication service by use of the degree of congestion calculated by the congestion calculation unit.

According to another embodiment of the present disclosure, there is provided a wireless communication method including receiving a radio signal transmitted from a base station providing a wireless communication service, calculating a degree of congestion of the wireless communication service based on a received result of the radio signal, and estimating an effective communication rate of the wireless communication service by use of the degree of congestion.

According to another embodiment of the present disclosure, there is provided a wireless communication system including a base station that provides a wireless communication service, and a wireless communication device including a receiving unit that receives a radio signal transmitted from the base station, a congestion calculation unit that calculates a degree of congestion of the wireless communication service based on a received result of the radio signal by the receiving unit, and an effective communication rate estimation unit that estimates an effective communication rate of the wireless communication service by use of the degree of congestion calculated by the congestion calculation unit.

According to the embodiments of the present disclosure described above, it is possible to estimate the effective communication rate of a wireless communication service in a wireless communication device.

BRIEF DESCRIPTION OF THE DRAWINGS

FIG. 4 is an explanatory view showing a table in which SIR and a maximum communication rate $R_{MAX}$ are associated;

FIG. 8 is an explanatory view showing an alternative example of a table in which SIR and a maximum communication rate $R_{MAX}$ are associated;

FIG. 10 is an explanatory view showing a configuration of a communication control unit according to a fourth embodiment of the disclosure.

DETAILED DESCRIPTION OF THE EMBODIMENT(S)

Figure 1:
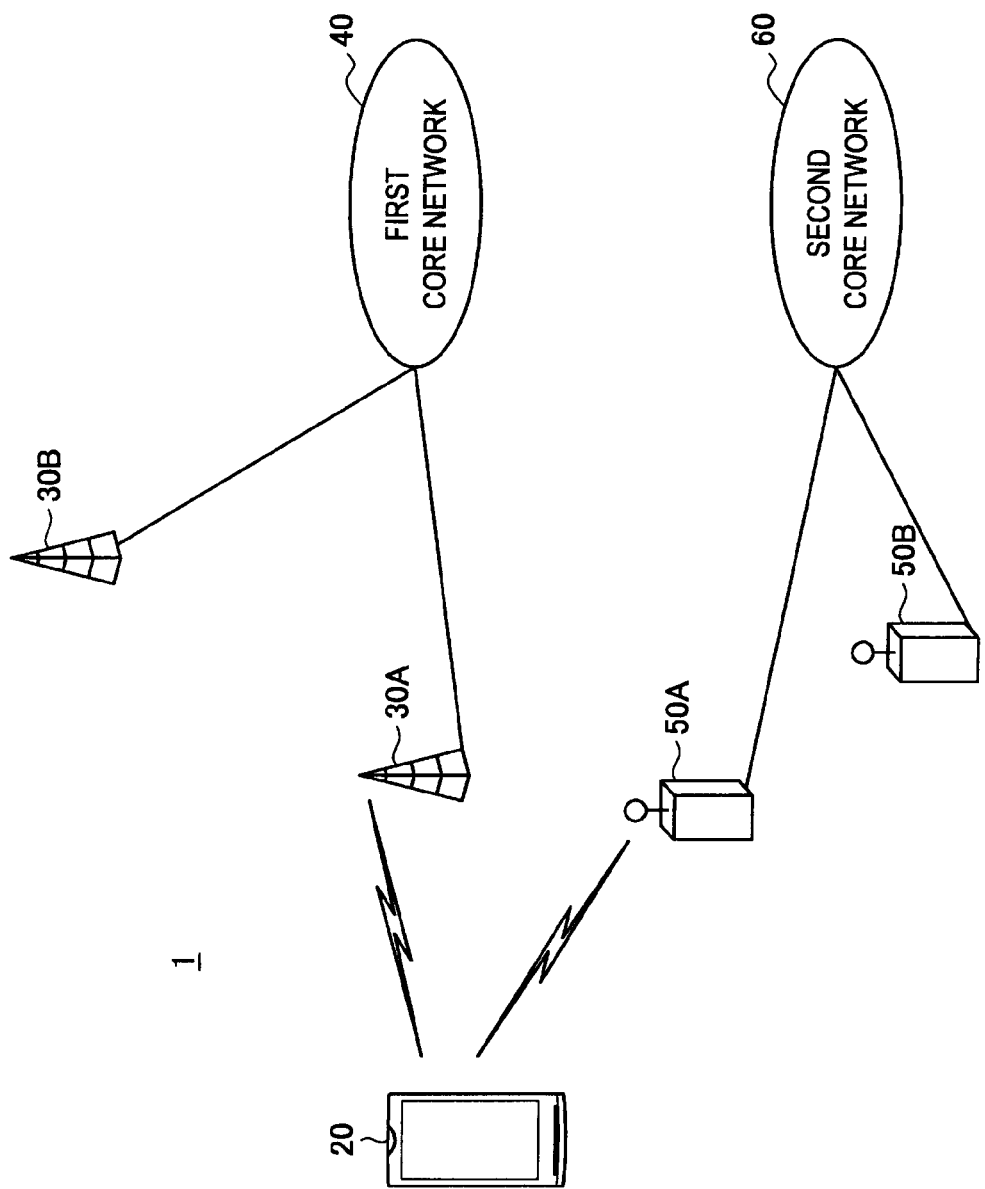
FIG. 1 is an explanatory view showing a configuration of a communication system according to an embodiment of the disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like first base stations 30A and 30B where necessary. However, when there is no particular need to distinguish between a plurality of structural elements having substantially the same function, they are denoted only by the same reference numeral. For example, when there is no particular need to distinguish between the first base stations 30A and 30B, they are referred to simply as the first base station 30.

Preferred embodiments of the disclosure will be described hereinafter in the following order.

1. Configuration of Communication System
2. Hardware Configuration of Mobile Terminal
3. First Embodiment
  3-1. Configuration of Mobile Terminal according to First Embodiment
  3-2. Operation of Mobile Terminal according to First Embodiment
4. Second Embodiment
5. Third Embodiment 6. Fourth Embodiment
7. Summary

1. Configuration of Communication System

A configuration of a communication system 1 according to an embodiment of the disclosure is described firstly with reference to FIG. 1.

FIG. 1 is an explanatory view showing a configuration of a communication system 1 according to an embodiment of the disclosure. Referring to FIG. 1, the communication system 1 according to the embodiment of the disclosure includes a mobile terminal 20, a plurality of first base stations 30A and 30B, a first core network 40, a plurality of second base stations 50A and 50B, and a second core network 60.

The first core network 40 is a network of a telecommunications carrier for providing a first wireless communication service (e.g. 3G service) and is connected with a plurality of first base stations 30. The first core network 40 includes MME (Mobile Management Entity) that performs setting of a session for data communication, control of opening or handover or the like, a gateway that controls routing, transfer or the like of user data and so on, for example.

The second core network 60 is a network of a telecommunications carrier for providing a second wireless communication service (e.g. LTE, WiMAX, 4G etc.) and is connected with a plurality of second base stations 50. The second core network 60, like the first core network 40, includes MME, a gateway and so on, for example.

Base stations such as the first base station 30 and the second base station 50 control communication by the mobile terminal 20. For example, the base stations transfer data received from the mobile terminal 20 to a destination, and transmit received data addressed to the mobile terminal 20 to the mobile terminal 20. Further, the base stations may communicate with the mobile terminal 20 by using a wireless multiple access technique such as OFDMA (Orthogonal Frequency Division Multiple Access), TDMA (Time Division Multiple Access), or CDMA Code Division Multiple Access). CDMA is briefly described hereinbelow.

In CDMA, 512 different scrambling codes are defined, and any of those scrambling codes is assigned to each base station. The base station transmits a transmission signal after spreading the spectrum by an orthogonal spreading code (e.g. channelisation code) according to the type of the transmission signal or the mobile terminal 20 and further spreading the spectrum by an assigned scrambling code. Note that, examples of the type of the transmission signal include CPICH (Commom Pilot Channel), Primary-CCPCH (Common Control Physical Channel), DPCH (Dedicated Physical Channel), and SCH (Synchronization Channel).

Further, SCH includes a primary SCH and a secondary SCH. The primary SCH and the secondary SCH are placed at the head of each of 15 slots constituting one frame, and the primary SCH is spread by $C_{PSC}$ (Primary Synchronization Code) and the secondary SCH is spread by $C_{SSC}$ (Secondary Synchronization Code).

There are 16 different $C_{SSC}$, and 64 different combination patterns are prepared for assignment to 15 slots. Any one of the 64 different patterns is assigned to each base station, and each base station transmits the secondary SCH by spread spectrum in each slot according to the assigned pattern. Note that the 512 scrambling codes are divided into 64 groups, each group corresponding to any of 64 combination patterns of $C_{SSC}$.

The mobile terminal 20 can communicate various kinds of data with another device through the first base station 30 or the second base station 50. The various kinds of data include music data such as music, lecture or radio program, video data such as movie, television program, video program, photograph, document, Web page, picture or chart, game, and software.

Further, the mobile terminal 20 according to the embodiment of the disclosure can estimate the effective communication rate of each wireless communication service even in stand-by mode, for example, as is described in detail later in "3. First Embodiment". Thus, the mobile terminal 20 according to the embodiment of the disclosure can select an appropriate wireless communication service based on the estimated effective communication rate.

It should be noted that, although the mobile terminal 20 is illustrated as an example of the wireless communication device, the wireless communication device is not limited thereto. For example, the wireless communication device may be an information processing device such as a PC (Personal Computer), a home video processing device (e.g. DVD recorder, videocassette recorder etc.), a PDA (Personal Digital Assistants), a home game device, or an electrical household appliance. Further, the wireless communication device may be an information processing device such as a mobile phone, a PHS (Personal Handyphone System), a portable music player, a portable video processing device, or a portable game device.

Further, as the first base station 30 and the second base station 50, various base stations are assumed such as a macro cell base station (eNodeB), a relay node that relays communication between a macro cell base station and the mobile terminal 20, and a femtocell (Home eNodeB) being a small base station for home use.

2. Hardware Configuration of Mobile Terminal

Next, a hardware configuration of the mobile terminal 20 according to an embodiment of the disclosure is described with reference to FIG. 2.

Figure 2:
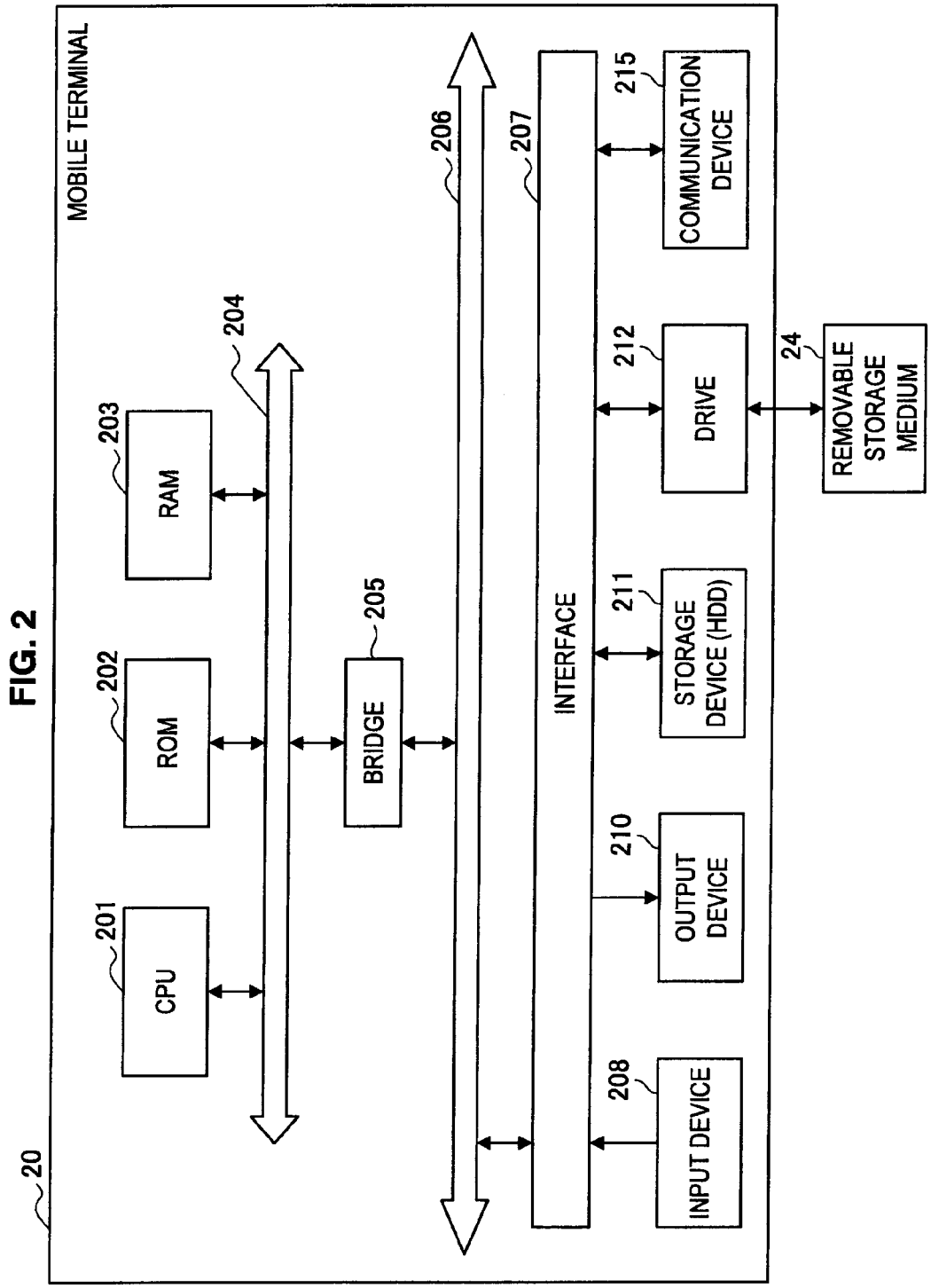
FIG. 2 is a block diagram showing a hardware configuration of a mobile terminal.

FIG. 2 is a block diagram showing a hardware configuration of the mobile terminal 20. The mobile terminal 20 includes a CPU (Central Processing Unit) 201, a ROM (Read Only Memory) 202, a RAM (Random Access Memory) 203, and a host bus 204. The mobile terminal 20 further includes a bridge 205, an external bus 206, an interface 207, an input device 208, an output device 210, a storage device (HDD) 211, a drive 212, and a communication device 215.

The CPU 201 serves as a processing device and a control device, and it controls the overall operations in the mobile terminal 20 according to various kinds of programs. The CPU 201 may be a microprocessor. The ROM 202 stores a program to be used by the CPU 201, a processing parameter and so on. The RAM 203 temporarily stores a program to be used in the execution on the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. Note that the host bus 204, the bridge 205 and the external bus 206 are not necessarily separated from one another, and their functions may be implemented by one bus.

The input device 208 may include an input means for a user to input information, such as a mouse, a keyboard, a touch panel, a button, a microphone, a switch or a lever, and an input control circuit that generates an input signal based on a user input and outputs it to the CPU 201, for example. A user of the mobile terminal 20 manipulates the input device 208 to thereby input various kinds of data or direct a processing operation to the mobile terminal 20.

The output device 210 includes a display device such as an LCD (Liquid Crystal Display) device, an OLED (Organic Light Emitting Display) device or a lamp. Further, the output device 210 includes a sound output device such as a speaker or a headphone. The output device 210 outputs reproduced contents, for example. Specifically, the display device displays various kinds of information such as reproduced video data by texts or images. On the other hand, the sound output device converts reproduced sound data or the like into sound and outputs the sound.

The storage device 211 is a device for data storage that is configured as an example of a storage unit of the mobile terminal 20. The storage device 211 may include a storage medium, a recording device that records data into the storage medium, a reading device that reads data from the storage medium, a deleting device that deletes data recorded in the storage medium or the like. The storage device 211 may be an HDD (Hard Disc Drive), for example. The storage device 211 drives a hard disk and stores a program to be executed by the CPU 201 or various data.

The drive 212 is a reader/writer for a storage medium, and it may be built in the mobile terminal 20 or attached externally. The drive 212 reads information that is recorded on a removable storage medium 24 such as a magnetic disk, an optical disk, a magneto-optical disk or a semiconductor memory which is attached thereto and outputs the information to the RAM 203.

The communication device 215 is an interface to communicate with the outside, for example. The communication device 215 may have a communication function with the first base station 30, a communication function with the second base station 50 or the like.

3. First Embodiment

A first embodiment of the disclosure is described hereinafter with reference to FIGS. 3 to 6.

3-1. Configuration of Mobile Terminal According to First Embodiment

Figure 3:
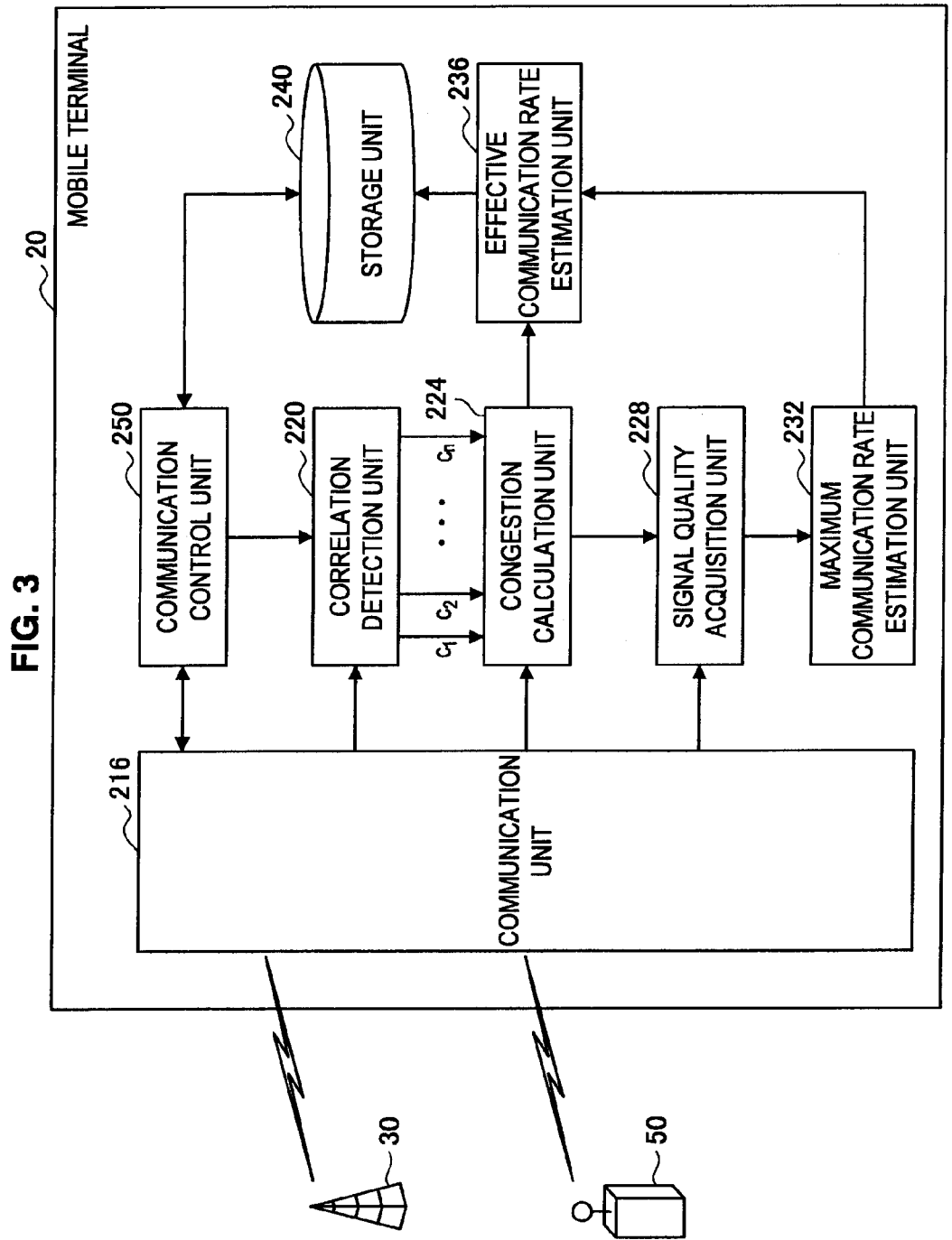
FIG. 3 is a functional block diagram showing a mobile terminal according to a first embodiment of the disclosure.

FIG. 3 is a functional block diagram showing the mobile terminal 20 according to the first embodiment of the disclosure. Referring to FIG. 3, the mobile terminal 20 according to the first embodiment includes a communication unit 216, a correlation detection unit 220, a congestion calculation unit 224, a signal quality acquisition unit 228, a maximum communication rate estimation unit 232, an effective communication rate estimation unit 236, a storage unit 240, and a communication control unit 250.

The communication unit 216 is compatible with a plurality of wireless communication services. Specifically, the communication unit 216 has a function of a receiving unit that receives a radio signal transmitted from the first base station 30 or the second base station 50 and a function of a transmitting unit that transmits a radio signal to the first base station 30 or the second base station 50. The communication unit 216 can perform communication according to CDMA or OFDMA, for example.

When a target is a wireless communication service using CDMA, the correlation detection unit 220 detects a correlation between a signal received by the communication unit 216 and a plurality of scrambling codes. Correlation outputs $c_1$ to $c_n$ of the respective scrambling codes which are obtained by the correlation detection unit 220 are supplied to the congestion calculation unit 224.

For example, the correlation detection unit 220 performs correlation detection called three-step cell search. By the three-step cell search, the correlation detection unit 220 can specify a scrambling code with the maximum correlation output, that is, a base station with the minimum transmission loss. The three-step cell search is briefly described hereinbelow.

First, the correlation detection unit 220 detects a correlation between a received signal and $C_{psc}$, and detects the received timing of the primary SCH (first step). Then, using the received timing of the primary SCH detected in the first step, the correlation detection unit 220 detects a pattern having the highest correlation with the received signal among the 64 different combination patterns of $C_{SSC}$ (second step). As a result, a scrambling code group is specified, and synchronism in units of frames is achieved. After that, the correlation detection unit 220 detects a correlation between each of 8 scrambling codes included in the specified scrambling code group and the received signal and specifies a scrambling code with the maximum correlation output (third step).

Note that, although the three-step cell search is described above as an example of the correlation detection between a received signal and a plurality of scrambling codes, the correlation detection by the correlation detection unit 220 is not limited to the three-step cell search.

For example, when turning off the power of the mobile terminal 20, information of a scrambling code related to a serving cell of the mobile terminal 20 and a peripheral cell is stored into the storage unit 240. Therefore, at the start-up of the mobile terminal 20, the correlation detection unit 220 may first detect a correlation between the scrambling code stored in the storage unit 240 and a received signal. Further, when information about a scrambling code of a peripheral cell is obtained from annunciation information of a serving cell, the correlation detection unit 220 may detect a correlation between the scrambling code of the peripheral cell and a received signal.

The congestion calculation unit 224 calculates the degree of traffic congestion of a target wireless communication service (base station) based on a radio signal received by the communication unit 216 or a correlation value for each scrambling code supplied from the correlation detection unit 220. Hereinafter, a method of calculating the degree of congestion of a wireless communication service using CDMA and a method of calculating the degree of congestion of a wireless communication service using OFDMA are described.

(Degree of Congestion of Wireless Communication Service Using CDMA)

In a wireless communication service using CDMA, when the number of multiplexed DPCHs (e.g. the number of users belonging to a base station) or the number of HS-DSCHs (e.g. the number of high speed downlink shared channels shared among a plurality of users in HSDPA) increases, the correlation output of each scrambling code becomes slightly larger though each DPCH or each HS-DSCH is spread. Therefore, when the maximum correlation output of a scrambling code is a and the minimum correlation output among the correlation outputs of the other scrambling codes is b, it is considered that, as the free space decreases with an increase in the number of users, or as the interference increases, the value of "correlation output b/correlation output a" increases.

Thus, the congestion calculation unit 224 calculates the ratio of the correlation output a and the correlation output b as the degree of congestion $k_{cong}$ of a wireless communication service by CDMA as shown in the following equation 1.

$$k_{cong} = \frac{b}{a} \quad \text{[Equation 1]}$$

(Degree of Congestion of Wireless Communication Service Using OFDMA)

From a wireless communication service using OFDMA, subcarrier allocation information of each frame is transmitted as one of control information. For example, in Mobile WiMAX, subcarrier allocation information called DL-MAP is transmitted.

Thus, based on the subcarrier allocation information received by the communication unit 216, the congestion calculation unit 224 calculates the proportion of the number of subcarriers allocated to each user to the total number of subcarriers for each frame as the degree of congestion $k_{cong}$.

Note that, when the mobile terminal 20 starts an application which mainly uses an uplink resource, the congestion calculation unit 224 may calculate the proportion of the number of subcarriers allocated to each user to the total number of subcarriers in an uplink as the degree of congestion $k_{cong}$. Further, the congestion calculation unit 224 may calculate the average value of the degree of congestion $k_{cong}$ of a downlink and the degree of congestion $k_{cong}$ of an uplink as the degree of congestion $k_{cong}$ of a wireless communication service.

Further, in LTE using OFDMA in a downlink, scheduling control information including resource allocation of a downlink and scheduling information of an uplink is supplied to each mobile terminal 20 by use of a downlink control signal (PDCCH: Physical Downlink Control CHannel), just like WiMAX. PDCCH is placed in the first n (n≤3) number of OFDM symbols of each downlink subframe. Thus, the congestion calculation unit 224 receives the first n number of OFDM symbols, acquires the resource allocation information to each user, and calculates the proportion of the number of subcarriers allocated to each user to the total number of subcarriers for each frame as the degree of congestion $k_{cong}$.

(Acquisition of Signal Quality)

The signal quality acquisition unit 228 acquires SIR (Signal to Interference Ratio), for example, as the signal quality of a signal received by the communication unit 216. Hereinafter, a method of acquiring SIR of a wireless communication service using CDMA and a method of acquiring SIR of a wireless communication service using OFDMA are described.

In CDMA, a total received power $P_{TOTAL}$ by the mobile terminal 20 is represented as the following equation 2. Note that, in the equation 2, $P_{CPICH}$ indicates a pilot signal power, $P_{HS-DSCH}$ indicates a high speed downlink shared channel power, and $P_{NOISE}$ indicates a noise component power.

$$P_{Total} = P_{CPICH} + P_{HS-DSCH} + P_{NOISE} \quad \text{[Equation 2]}$$

On the other hand, an interference component power I is represented as the following equation 3. Note that, in the equation 3, $SF_{CPICH}$ indicates a spreading factor of a pilot signal.

$$I = \frac{P_{Total} - P_{CPICH}}{SF_{CPICH}} \quad \text{[Equation 3]}$$

The relationship between the total received power $P_{TOTAL}$ and the pilot signal power $P_{CPICH}$ can be represented with use of the degree of congestion $k_{cong}$ calculated by the congestion calculation unit 224, as shown in the following equation 4.

$$k_{cong} = \sqrt{\frac{P_{Total}}{SF_{CPICH} \cdot P_{CPICH}}} \Rightarrow \frac{P_{Total}}{P_{CPICH}} = SF_{CPICH} \cdot k_{cong}^2 \quad \text{[Equation 4]}$$

Thus, the signal quality acquisition unit 228 can acquire SIR of a pilot signal, i.e. $SIR_{CPICH}$, from the spreading factor $SF_{CPICH}$ of the pilot signal and the degree of congestion $k_{cong}$ as shown in the following equation 5.

$$SIR_{CPICH} = \frac{SF_{CPICH} \cdot P_{CPICH}}{P_{Total} - P_{CPICH}} = \frac{1}{k_{cong}^2 - \frac{1}{SF_{CPICH}}} \quad \text{[Equation 5]}$$

On the other hand, in OFDMA, the signal quality acquisition unit 228 acquires SIR of a preamble signal or a pilot signal as the received quality based on the received result by the communication unit 216 of the preamble signal or the pilot signal used for frame synchronization or base station discrimination.

(Estimation of Maximum Communication Rate)

It is considered that the maximum communication rate becomes higher as SIR (including $SIR_{CPICH}$) acquired by the signal quality acquisition unit 228 increases. Thus, the maximum communication rate estimation unit 232 estimates the maximum communication rate $R_{MAX}$ according to the criterion where the maximum communication rate $R_{MAX}$ becomes higher as SIR acquired by the signal quality acquisition unit 228 increases. The maximum communication rate estimation unit 232 may use the table as shown in FIG. 4 as an example of the above criterion.

FIG. 4 is an explanatory view showing a table in which SIR and the maximum communication rate $R_{MAX}$ are associated. In the table shown in FIG. 4, a different maximum communication rate $R_{MAX}$ is associated with each range of SIR. By reference to the table, the maximum communication rate estimation unit 232 can estimate the maximum communication rate $R_{MAX}$ with SIR acquired by the signal quality acquisition unit 228 as an argument.

Note that the table in which SIR and the maximum communication rate $R_{MAX}$ are associated as shown in FIG. 4 may be stored in the storage unit 240 with respect to each wireless communication service.

(Estimation of Effective Communication Rate)

It is considered that the effective communication rate of wireless communication becomes lower as the degree of traffic congestion increases. Thus, the effective communication rate estimation unit 236 estimates the effective communication rate $R_{eff}$ according to the criterion where the effective communication rate $R_{eff}$ with respect to the maximum communication rate $R_{MAX}$ becomes lower as the degree of congestion $k_{cong}$ calculated by the congestion calculation unit 224 is higher. For example, the effective communication rate estimation unit 236 may estimate the effective communication rate $R_{eff}$ according to the function where the effective communication rate $R_{eff}$ becomes lower as the degree of congestion $k_{cong}$ becomes higher as shown in the following equation 6.

$$R_{eff} = (1.225 - 4.5 \times k_{cong}) \times R_{MAX} \quad \text{[Equation 6]}$$

The effective communication rate $R_{eff}$ estimated by the effective communication rate estimation unit 236 in the above manner is stored into the storage unit 240 with respect to each wireless communication service. For example, the effective communication rate estimation unit 236 estimates the effective communication rate $R_{eff}$ with the first base station 30 by the first wireless communication service and the effective communication rate $R_{eff}$ with the second base station 50 by the second wireless communication service shown in FIG. 1, and the storage unit 240 stores those effective communication rates $R_{eff}$.

(Selection of Connection Destination)

The communication control unit 250 controls the overall communication in the mobile terminal 20. For example, the communication control unit 250 controls transmission and reception by the communication unit 216, correlation detection by the correlation detection unit 220 and so on. Further, the communication control unit 250 has a function as a connection destination selection unit that selects a wireless communication service to be connected in consideration of the effective communication rate of each wireless communication service stored in the storage unit 240.

Specifically, the communication control unit 250 selects a wireless communication service suitable for an application among the wireless communication services supported by the mobile terminal 20 in consideration of a communication cost of each wireless communication service and a communication rate required for the application. For example, the communication control unit 250 may select, as a connection destination, a wireless communication service with the lowest communication cost among the wireless communication services whose effective communication rate exceeds a communication rate required for an application.

After selecting the connection destination wireless communication service, the communication control unit 250 controls the communication unit 216 to start a connection process with the selected wireless communication service.

As described above, the mobile terminal 20 according to the first embodiment of the disclosure can estimate the effective communication rate of a wireless communication service before establishing a connection with the wireless communication service. Further, the mobile terminal 20 can select a wireless communication service suitable for an application as a connection destination based on the estimated effective communication rate.

3-2. Operation of Mobile Terminal According to First Embodiment

The configuration of the mobile terminal 20 according to the first embodiment of the disclosure is described above. The operation of the mobile terminal 20 according to the first embodiment of the disclosure is described hereinafter with reference to FIGS. 5 and 6.

Figure 5:
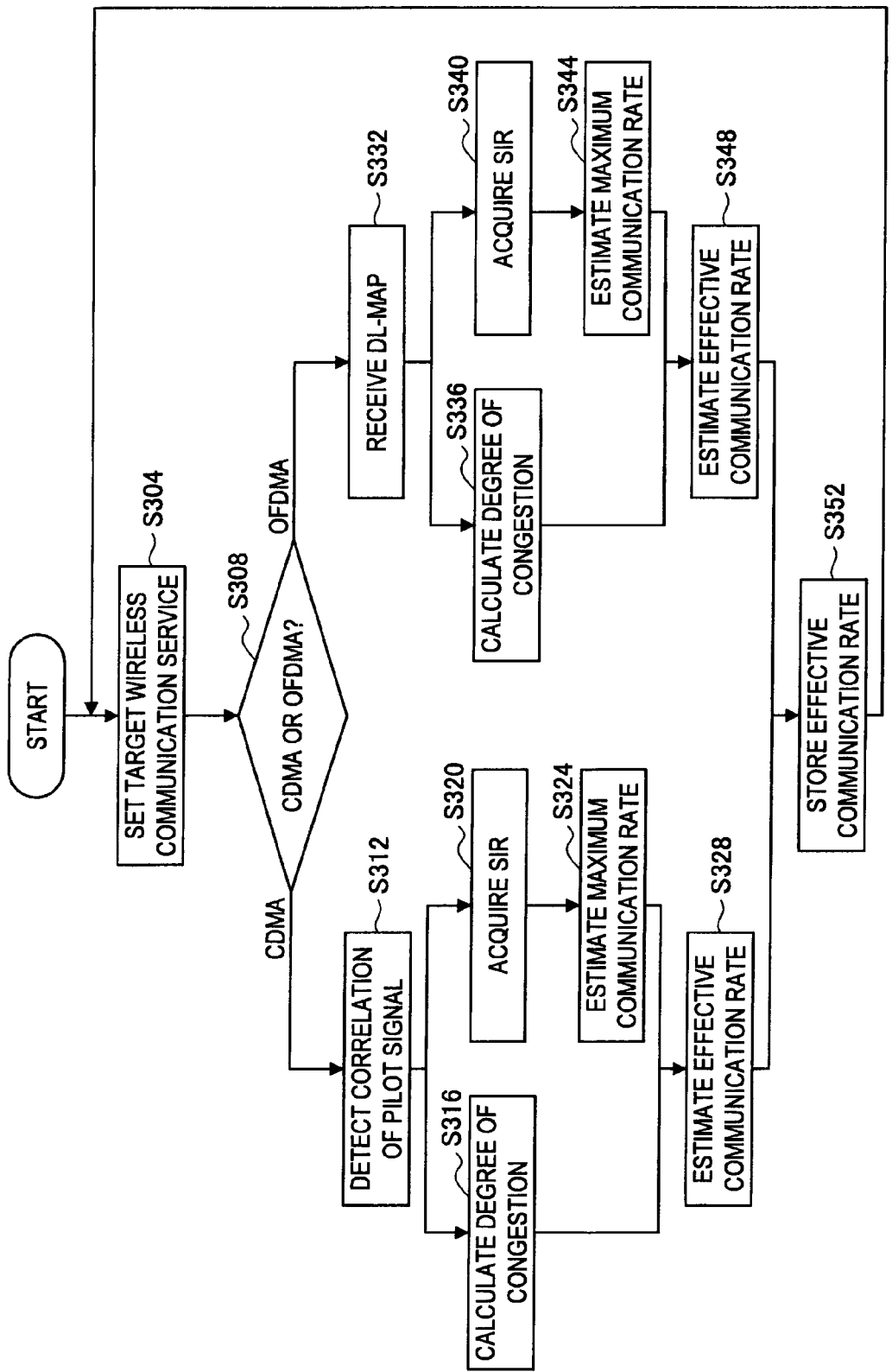
FIG. 5 is a flowchart showing an operation of the mobile terminal according to the first embodiment of the disclosure.
Figure 6:
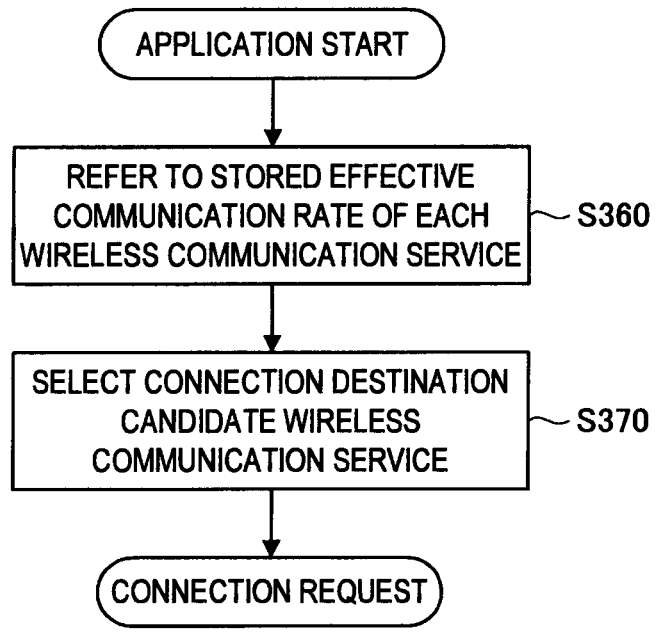
FIG. 6 is a flowchart showing an operation of the mobile terminal according to the first embodiment of the disclosure.

FIGS. 5 and 6 are flowcharts showing the operation of the mobile terminal 20 according to the first embodiment of the disclosure. Referring to FIG. 5, the mobile terminal 20 first sets a wireless communication service as a target of estimating an effective communication rate (S304). The subsequent operation differs depending on the multiplex mode used by the wireless communication service.

For example, when the target wireless communication service uses CDMA (S308), the correlation detection unit 220 detects a correlation between a received signal and a plurality of scrambling codes (S312). Then, the congestion calculation unit 224 calculates the degree of congestion $k_{cong}$ according to the equation 1 based on the correlation output obtained by the correlation detection unit 220 (S316).

Further, the signal quality acquisition unit 228 acquires SIR of a pilot signal according to the equation 5 by use of the degree of congestion $k_{cong}$ calculated by the congestion calculation unit 224, for example (S320). Then, the maximum communication rate estimation unit 232 estimates the maximum communication rate $R_{MAX}$ from the SIR of the pilot signal acquired by the signal quality acquisition unit 228 (S324).

After that, the effective communication rate estimation unit 236 estimates the effective communication rate $R_{eff}$ from the degree of congestion $k_{cong}$ calculated by the congestion calculation unit 224 and the maximum communication rate $R_{MAX}$ estimated by the maximum communication rate estimation unit 232 (S328). Then, the storage unit 240 stores the effective communication rate $R_{eff}$ estimated by the effective communication rate estimation unit 236 in association with the wireless communication service (S352).

On the other hand, when the target wireless communication service uses OFDMA (S308), the communication unit 216 receives DL-MAP from the base station (S332). Then, the congestion calculation unit 224 calculates the degree of congestion $k_{cong}$ based on the number of allocated subcarriers described in the received DL-MAP (S336).

Further, the signal quality acquisition unit 228 acquires SIR of a preamble signal, a pilot signal or the like from the preamble signal or the pilot signal received by the communication unit 216 (S340). Then, the maximum communication rate estimation unit 232 estimates the maximum communication rate $R_{MAX}$ from the SIR acquired by the signal quality acquisition unit 228 (S344).

After that, the effective communication rate estimation unit 236 estimates the effective communication rate $R_{eff}$ from the degree of congestion $k_{cong}$ calculated by the congestion calculation unit 224 and the maximum communication rate $R_{MAX}$ estimated by the maximum communication rate estimation unit 232 (S348). Then, the storage unit 240 stores the effective communication rate $R_{eff}$ estimated by the effective communication rate estimation unit 236 in association with the wireless communication service (S352).

When the mobile terminal 20 starts an application in the state where the effective communication rates $R_{eff}$ of the respective wireless communication services are stored in the storage unit 240, the communication control unit 250 refers to the effective communication rate $R_{eff}$ of each wireless communication service stored in the storage unit 240 as shown in FIG. 6 (S360). Then, the communication control unit 250 selects a wireless communication service as a candidate for a connection destination based on the effective communication rate $R_{eff}$ of each wireless communication service (S370). After that, the communication unit 216 makes a connection request for the wireless communication service selected by the communication control unit 250 according to control by the communication control unit 250.

4. Second Embodiment

The first embodiment of the disclosure is described above. Next, a second embodiment of the disclosure is described with reference to FIGS. 7 and 8. According to the second embodiment of the disclosure, it is possible to appropriately update a table for estimating the maximum communication rate according to the real environment.

Figure 7:
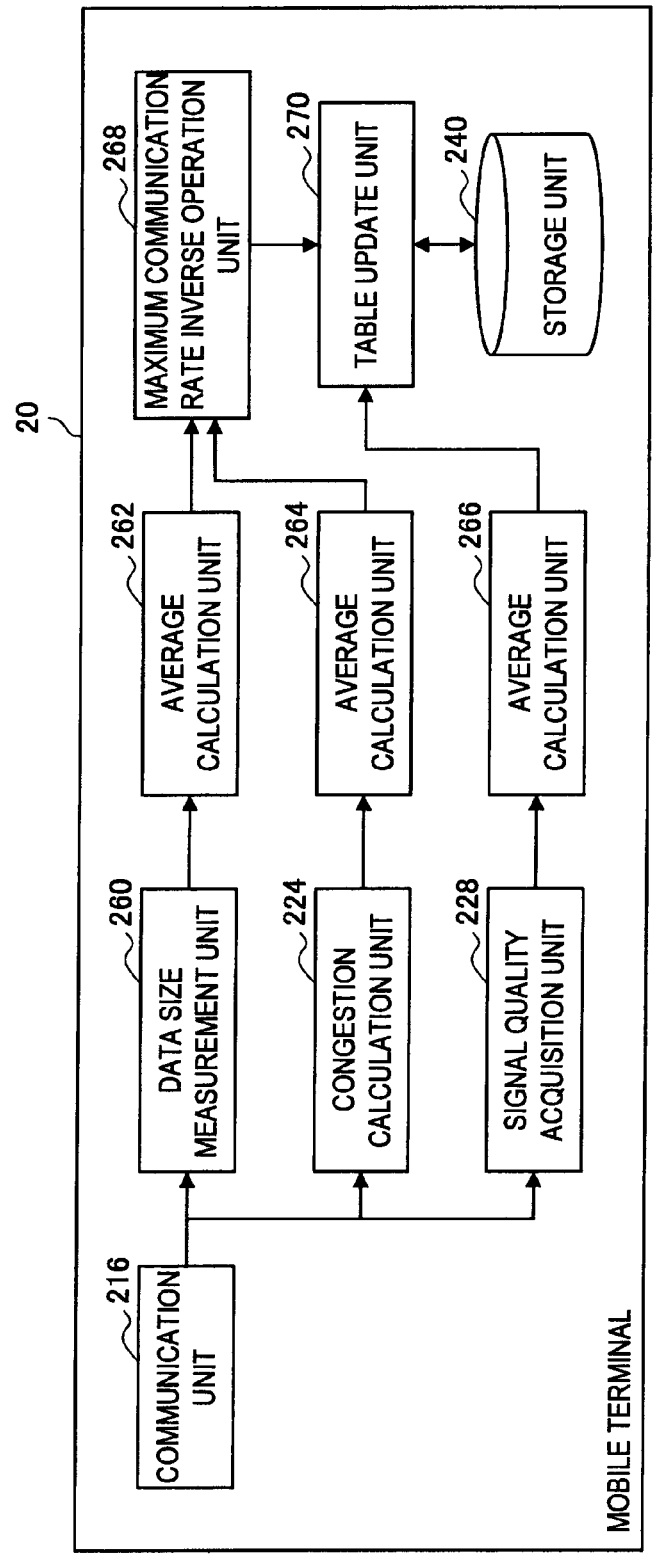
FIG. 7 is a functional block diagram showing a configuration of a mobile terminal according to a second embodiment of the disclosure.

FIG. 7 is a functional block diagram showing a configuration of a mobile terminal 20 according to the second embodiment of the disclosure. Referring to FIG. 7, the mobile terminal 20 according to the embodiment includes a communication unit 216, a congestion calculation unit 224, a signal quality acquisition unit 228, a storage unit 240, a data size measurement unit 260, average calculation units 262, 264 and 266, a maximum communication rate inverse operation unit 268, and a table update unit 270. Note that, the mobile terminal 20 according to the second embodiment also includes the correlation detection unit 220, the effective communication rate estimation unit 236, the communication control unit 250 and so on, just like the one according to the first embodiment, although not shown in FIG. 7.

Data which has been demodulated and decoded by the communication unit 216 is supplied to the data size measurement unit 260. The data size measurement unit 260 measures the decoded data size for every predetermined period of time (e.g. TTI: Transmission Time Interval). The average calculation unit 262 averages the data sizes measured by the data size measurement unit 260 and thereby acquires the actual effective communication rate.

Further, the average calculation unit 264 accumulates the degrees of congestion $k_{cong}$ calculated by the congestion calculation unit 224 for a given period of time and averages them. Likewise, the average calculation unit 266 accumulates the SIRs acquired by the signal quality acquisition unit 228 for a given period of time and averages them.

Using the actual effective communication rate supplied from the average calculation unit 262 and the degree of congestion $k_{cong}$ supplied from the average calculation unit 264, the maximum communication rate inverse operation unit 268 inversely calculates the maximum communication rate from which the actual effective communication rate is obtained based on the degree of congestion $k_{cong}$. For example, the maximum communication rate inverse operation unit 268 calculates the maximum communication rate $R_{MAX}$ in an inverse manner by substituting the actual effective communication rate into $R_{\it eff}$ in the equation 6 and substituting the degree of congestion $k_{cong}$ supplied from the average calculation unit 264 into $k_{cong}$ in the equation 6.

The table update unit 270 updates the table stored in the storage unit 240 according to a difference between the relationship of the maximum communication rate $R_{MAX}$ obtained by the maximum communication rate inverse operation unit 268 and the SIR supplied from the average calculation unit 266 and the relationship of the maximum communication rate and SIR on the table stored in the storage unit 240.

For example, if the table is configured in such a way that a correction value c can be set to the lower limit and the upper limit of SIR corresponding to each maximum communication rate as shown in FIG. 8, the table update unit 270 can update the table by adjusting the correction value c.

Specifically, the table update unit 270 may adjust the correction value c so that the SIR supplied from the average calculation unit 266 is within the range (or the center of the range) of SIR corresponding to the maximum communication rate $R_{MAX}$ obtained by the maximum communication rate inverse operation unit 268. Assume, for example, the case where the maximum communication rate $R_{MAX}$ obtained by the maximum communication rate inverse operation unit 268 is "1.292M" and the SIR supplied from the average calculation unit 266 is "12.4 dB". In this case, the table update unit 270 adjusts the correction value c to a value of equal to or greater than 0.6 and smaller than 1.6, so that the SIR "12.4 dB" supplied from the average calculation unit 266 falls within the range of SIR corresponding to the maximum communication rate $R_{MAX}$ "1.292M". In this configuration, the table stored in the storage unit 240 can be appropriately updated according to the real environment.

Alternative Example

Although the case where the table stored in the storage unit 240 is updated according to the real environment is described above, a function for estimating the effective communication rate, rather than the table, may be updated according to the real environment.

The function for estimating the effective communication rate is $f(k_{cong}, R_{MAX})$, and the function after correction is defined as shown in the following equation 7.

$$R_{\it eff} = d \cdot f(k_{cong}, R_{MAX}) \quad \text{[Equation 7]}$$

Further, the mobile terminal 20 acquires the maximum communication rate $R_{MAX}$ corresponding to the SIR supplied from the average calculation unit 266 from the table shown in FIG. 4. Then, the mobile terminal 20 divides the actual effective communication rate supplied from the average calculation unit 262 by a value obtained by substituting the maximum communication rate $R_{MAX}$ and the degree of congestion $k_{cong}$ supplied from the average calculation unit 264 into $f(k_{cong}, R_{MAX})$, thereby obtaining a correction coefficient d. By incorporating the correction coefficient d into the function for estimating the effective communication rate, the effect equivalent to that obtained when updating the table according to the real environment can be obtained.

5. Third Embodiment

The second embodiment of the disclosure is described above. Hereinafter, a third embodiment of the disclosure is described. The third embodiment relates to a measurement report from the mobile terminal 20. Normally, the measurement report includes information related to a received quality in the mobile terminal 20, and, based on the measurement report, a core network hands over the mobile terminal 20 to a wireless communication service with a higher received quality. However, there may be a case where a wireless communication service with a high received quality (e.g. SIR) in the mobile terminal 20 has a low effective communication rate depending on the degree of congestion. Thus, in the third embodiment of the disclosure, the core network can perform hand over control by taking the effective communication rate estimated in the mobile terminal 20 into account. The third embodiment of the disclosure is described hereinafter in detail with reference to FIG. 9.

Figure 9:
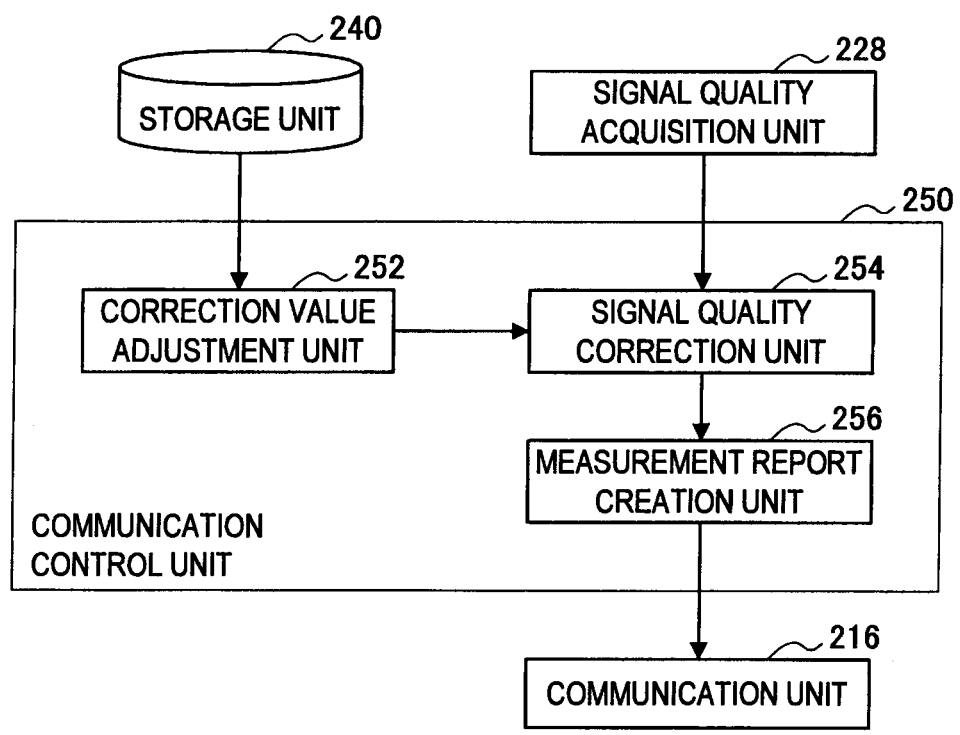
FIG. 9 is an explanatory view showing a configuration of a communication control unit according to a third embodiment of the disclosure.

FIG. 9 is an explanatory view showing a configuration of a communication control unit 250 according to the third embodiment of the disclosure. Referring to FIG. 9, the communication control unit 250 according to the third embodiment includes a correction value adjustment unit 252, a signal quality correction unit 254, and a measurement report creation unit 256.

The correction value adjustment unit 252 adjusts a correction value in accordance with the effective communication rate of the wireless communication service stored in the storage unit 240. The correction value is a value that allows a wireless communication service suitable for a wireless communication system as a hand over destination to be selected on the core network side in consideration of a communication rate and a communication cost required for a running application. Specifically, the correction value is a value for correcting the received quality acquired by the signal quality acquisition unit 228 in the signal quality correction unit 254, and it is used for making subtraction of the received level of CPICH, for example. Thus, the correction value adjustment unit 252 adjusts the correction value so that the value becomes larger as the effective communication rate of a wireless communication service is lower.

The signal quality correction unit 254 corrects the received quality of a pilot signal, for example, acquired by the signal quality acquisition unit 228 with use of the correction value adjusted by the correction value adjustment unit 252. Consequently, even if the received level of CPICH acquired by the signal quality acquisition unit 228 is high, for example, when the correction value adjusted by the correction value adjustment unit 252 is large (when the effective communication rate is low), the received level of CPICH is corrected to a smaller value than the actual one.

The measurement report creation unit 256 creates a measurement report to be reported to the core network side based on the corrected received quality corrected by the signal quality correction unit 254. Then, the communication unit 216 transmits the measurement report created by the measurement report creation unit 256 to the core network side. Further, the core network side controls the handover of the mobile terminal 20 based on the measurement report transmitted from the mobile terminal 20.

The measurement report of a wireless communication service with a low effective communication rate is created based on a lower received quality than the actual one. This prevents a wireless communication service with a low effective communication rate from being selected in the core network as a wireless communication service as a handover destination of the mobile terminal 20.

Note that, when the core network is designed to use the effective communication rate which is estimated in the mobile terminal 20 at the time of handover control, the mobile terminal 20 may transmit the measurement report which separately includes the received quality acquired by the signal quality acquisition unit 228 and the effective communication rate information.

Further, in order to achieve handover between wireless communication services, it is desirable that a communication path for the core networks of different wireless communication services to communicate with each other is reserved. Assume, for example, where the first core network 40 shown in FIG. 1 receives the measurement report of the first wireless communication service and the second wireless communication service from the mobile terminal 20, and determines that the mobile terminal 20 should be handed over to the second wireless communication service. In this case, if a wired or wireless communication path is reserved between the first core network 40 and the second core network 60, the first core network 40 and the second core network 60 can exchange information for the handover of the mobile terminal 20 with each other.

6. Fourth Embodiment

A fourth embodiment of the disclosure is described hereinbelow. Like the third embodiment, the fourth embodiment also relates to a measurement report from the mobile terminal 20. The fourth embodiment of the disclosure is described hereinafter in detail with reference to FIG. 10.

FIG. 10 is an explanatory view showing a configuration of a communication control unit 250' according to the fourth embodiment of the disclosure. Referring to FIG. 10, the control unit 250' according to the fourth embodiment includes a correction value adjustment unit 252, a signal quality correction unit 254, a measurement report creation unit 256, an application determination unit 258, and a switching unit 259. The explanation of substantially the same elements as those in the third embodiment is omitted, and elements different from those in the third embodiment are mainly described below.

The application determination unit 258 determines the sensitivity of an application to be started or a running application with respect to a communication rate. For example, the application determination unit 258 determines that an application that communicates streaming data such as a video or sound is sensitive to a communication rate and that an application such as a Web browser is not sensitive to a communication rate.

The switching unit 259 switches a supply destination of the received quality acquired by the signal quality acquisition unit 228 between the signal quality correction unit 254 and the measurement report creation unit 256 according to the determination result by the application determination unit 258.

In the case where an application is not sensitive to a communication rate, there is no significant disadvantage when a wireless communication service with a low effective communication rate is selected as a handover destination, and therefore the significance of making correction to the received quality based on the effective communication rate is low. Thus, when it is determined that an application is sensitive to a communication rate, the switching unit 259 supplies the received quality acquired by the signal quality acquisition unit 228 to the signal quality correction unit 254, and when it is determined that an application is not sensitive to a communication rate, the switching unit 259 supplies the received quality acquired by the signal quality acquisition unit 228 to the measurement report creation unit 256.

Thus, according to the fourth embodiment of the disclosure, when it is determined that an application is not sensitive to a communication rate, it is possible to bypass the correction process of the received quality based on the effective communication rate.

7. Summary

As described above, the mobile terminal 20 according to the first embodiment of the disclosure can estimate the effective communication rate of a wireless communication service before establishing a connection with the wireless communication service. Further, the mobile terminal 20 according to the first embodiment of the disclosure can select a wireless communication service suitable for an application as a connection destination based on the estimated effective communication rate.

According to the second embodiment of the disclosure, a table, a function or the like for estimating the maximum communication rate can be updated appropriately according to the real environment. Further, according to the third embodiment of the disclosure, the case where a wireless communication service with a low effective communication rate is selected in the core network as a wireless communication service as a handover destination of the mobile terminal 20 can be prevented. According to the fourth embodiment of the disclosure, when it is determined that an application is not sensitive to a communication rate, the correction process of the received quality based on the effective communication rate can be bypassed.

Although preferred embodiments of the disclosure are described in detail above with reference to the appended drawings, the disclosure is not limited thereto. It should be understood by those skilled in the art that various modifications, combinations, sub-combinations and alterations may occur depending on design requirements and other factors insofar as they are within the scope of the appended claims or the equivalents thereof.

Further, it is not always necessary to perform the steps in the processing of the mobile terminal 20 of the specification in chronological order according to the sequence shown in the flowcharts. For example, the steps in the processing of the mobile terminal 20 may be processed in a difference sequence from the sequence shown in the flowcharts or may be processed in parallel.

Furthermore, it is possible to create a computer program that causes hardware such as the CPU 201, the ROM 202 and the RAM 203 incorporated in the mobile terminal 20 to perform the equal functions to the elements of the mobile terminal 20 described above. Further, a storage medium that stores such a computer program may be provided.

The present disclosure contains subject matter related to that disclosed in Japanese Priority Patent Application JP 2010-142384 filed in the Japan Patent Office on Jun. 23, 2010, the entire content of which is hereby incorporated by reference.

What is claimed is:

1. A wireless communication device comprising:
 a receiving unit that receives a radio signal transmitted from a base station providing a wireless communication service;
 a congestion calculation unit that calculates a degree of congestion of the wireless communication service based on the radio signal received by the receiving unit,
 wherein the degree of congestion is calculated based on a proportion of a number of allocated subcarriers to a total number of subcarriers; and
 an effective communication rate estimation unit that estimates an effective communication rate of the wireless communication service by use of the degree of congestion calculated by the congestion calculation unit.

2. The wireless communication device according to claim 1, further comprising:
 a maximum communication rate estimation unit that estimates a maximum communication rate of the wireless communication service based on a signal quality of the radio signal received by the receiving unit,
 wherein the effective communication rate estimation unit estimates the effective communication rate based on the maximum communication rate estimated by the maximum communication rate estimation unit and the degree of congestion calculated by the congestion calculation unit.

3. The wireless communication device according to claim 2,
 wherein the maximum communication rate estimation unit estimates the maximum communication rate according to a criterion where the maximum communication rate becomes higher as the signal quality of the radio signal received by the receiving unit is higher.

4. The wireless communication device according to claim 3,
 wherein the maximum communication rate estimation unit estimates the maximum communication rate corresponding to the signal quality of the radio signal received by the receiving unit by referring to a table indicating a relationship between the signal quality and the maximum communication rate.

5. The wireless communication device according to claim 4, wherein
 the effective communication rate estimation unit estimates the effective communication rate according to a criterion where the effective communication rate with respect to the maximum communication rate becomes lower as the degree of congestion calculated by the congestion calculation unit is higher.

6. The wireless communication device according to claim 1, further comprising:
 a correlation detection unit that detects a correlation between the radio signal received by the receiving unit and each of a plurality of scrambling codes when the base station transmits the radio signal spectrum-spread by each of the plurality of scrambling codes,
 wherein the congestion calculation unit calculates the degree of congestion from a relationship between a maximum correlation detected by the correlation detection unit and another correlation.

7. The wireless communication device according to claim 6, wherein
 the congestion calculation unit calculates a ratio of the maximum correlation detected by the correlation detection unit and a minimum correlation as the degree of congestion.

8. The wireless communication device according to claim 7,
 wherein the correlation detection unit detects a correlation between the radio signal received by the receiving unit and each of the plurality of scrambling codes included in a scrambling code group specified by a second step in three-step cell search.

9. The wireless communication device according to claim 1,
 wherein the base station transmits a radio signal by OFDMA (Orthogonal Frequency Division Multiple Access).

10. The wireless communication device according to claim 1, further comprising:
 a measurement unit that measures an actual effective communication rate after establishing a connection with the base station;
 a maximum communication rate inverse operation unit that inversely calculates a maximum communication rate from which the effective communication rate measured by the measurement unit is estimated according to a criterion of the effective communication rate estimation unit by use of the degree of congestion calculated by the congestion calculation unit; and
 an update unit that updates the table based on a relationship between the maximum communication rate obtained by inverse operation by the maximum communication rate inverse operation unit and a signal quality of the radio signal received by the receiving unit.

11. The wireless communication device according to claim 1, comprising:
 a storage unit that stores the effective communication rate estimated by the effective communication rate estimation unit for each wireless communication service; and
 a connection destination selection unit that selects a connection destination wireless communication service by referring to the effective communication rate for each wireless communication service stored in the storage unit.

12. The wireless communication device according to claim 1, comprising:
 a correction unit that corrects a received quality of the radio signal in accordance with the effective communication rate estimated by the effective communication rate estimation unit;
 a creation unit that creates a measurement report based on a corrected received quality of the radio signal corrected by the correction unit; and
 a transmitting unit that transmits the measurement report created by the creation unit to the base station.

13. The wireless communication device according to claim 12, wherein, when the effective communication rate estimated by the effective communication rate estimation unit is low, the correction unit corrects the received quality of the radio signal to be relatively lower.

14. The wireless communication device according to claim 13, further comprising:
an application determination unit that determines sensitivity of an application used by the wireless communication device with respect to a communication rate,
wherein, upon determining that the application is not sensitive to the communication rate, the creation unit creates the measurement report based on an uncorrected received quality of the radio signal.

15. A non-transitory computer readable medium having stored thereon, a set of computer-executable instructions for causing a computer to perform steps comprising:
receiving a radio signal transmitted from a base station providing a wireless communication service, wherein the base station transmits the radio signal spectrum-spread by a scrambling code;
calculating a degree of congestion of the wireless communication service based on a correlation between the received radio signal and the scrambling code;
estimating an effective communication rate of the wireless communication service by use of the degree of congestion; and
measuring an actual effective communication rate after establishing a connection with the base station.

16. A wireless communication method comprising:
receiving a radio signal transmitted from a base station providing a wireless communication service, wherein the base station transmits the radio signal spectrum-spread by a scrambling code;
calculating a degree of congestion of the wireless communication service based on a correlation between the received radio signal and the scrambling code;
estimating an effective communication rate of the wireless communication service by use of the degree of congestion; and
measuring an actual effective communication rate after establishing a connection with the base station.

17. A wireless communication system comprising:
a base station that provides a wireless communication service; and
a wireless communication device including:
a receiving unit that receives a radio signal transmitted from the base station,
a congestion calculation unit that calculates a degree of congestion of the wireless communication service based on the radio signal received by the receiving unit, wherein the degree of congestion is calculated as a proportion of a number of allocated subcarriers to a total number of subcarriers,
an effective communication rate estimation unit that estimates an effective communication rate of the wireless communication service by use of the degree of congestion calculated by the congestion calculation unit, and
a measurement unit that measures an actual effective communication rate after establishing a connection with the base station.

18. The wireless communication device according to claim 1, further comprising
a correlation detection unit that detects a correlation between the radio signal received by the receiving unit and each of a plurality of scrambling codes to determine one scrambling code from the plurality of scrambling codes with a maximum correlation output,
wherein the maximum correlation output represents the base station with the minimum transmission loss.

* * * * *